(12) United States Patent
Osmond

(10) Patent No.: US 6,317,759 B1
(45) Date of Patent: Nov. 13, 2001

(54) METHOD AND APPARATUS FOR PROVIDING AN APPLICATIONS DEVELOPMENT SYSTEM FOR INTERNET BASED APPLICATIONS

(75) Inventor: Roger Osmond, Littleton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 08/980,633

(22) Filed: Dec. 1, 1997

(51) Int. Cl.[7] .............................. G06F 17/21; G06F 9/00
(52) U.S. Cl. .................................................. 707/513; 717/5
(58) Field of Search ............................... 707/513, 526, 707/500, 501, 516, 104; 709/200, 203, 220; 345/326, 335; 717/5–9

(56) References Cited

U.S. PATENT DOCUMENTS

| | | |
|---|---|---|
| 5,613,118 | 3/1997 | Heisch et al. . |
| 5,617,564 | 4/1997 | Tomotake . |
| 5,623,656 * | 4/1997 | Lyons ................................... 395/610 |
| 5,671,416 | 9/1997 | Elson . |
| 5,745,908 * | 4/1998 | Anderson et al. .................... 707/513 |
| 5,774,726 * | 6/1998 | Ahmed ..................................... 717/5 |
| 5,877,759 * | 3/1999 | Bauer .................................. 345/339 |
| 5,918,237 * | 6/1999 | Montabano ......................... 707/513 |
| 5,930,792 * | 7/1999 | Polcyn ..................................... 707/9 |
| 5,946,488 * | 8/1999 | Tanguay et al. ......................... 717/5 |

* cited by examiner

Primary Examiner—Hosain T. Alam
Assistant Examiner—Alford W. Kindred
(74) Attorney, Agent, or Firm—John M. Gunther, Esq.; Krishnendu Gupta, Esq.; Christopher K. Gagne, Esq.

(57) ABSTRACT

A method and apparatus for providing an HTML applications development environment is disclosed. The applications development environment is used to develop large HTML based applications. The invention includes a preprocessor and associated preprocessor commands which are inserted into a source HTML file. The preprocessor reads the source file, evaluates the preprocessor commands, and makes the appropriate substitutions into an output HTML file.

5 Claims, 4 Drawing Sheets

METHOD AND APPARATUS FOR PROVIDING AN APPLICATIONS DEVELOPMENT SYSTEM FOR INTERNET BASED APPLICATIONS

BACKGROUND OF THE INVENTION

This invention relates generally to computer program applications and more particularly to providing a method of providing an application development environment using the hypertext markup language (HTML).

As is known in the art, one type of interface by which a user may access information over the internet or an intranet is a so called web browser. A web browser typically provides a graphical interface and allows a user navigate or "browse" the internet using a hypertext information and communication system (i.e. the world wide web). One such well known browser is the Netscape browser developed by Netscape Communications Corporation. Thus, any computer with a network connection to the internet may potentially be accessed by a user with a computer also connected to the internet and running a web browser.

The proliferation of use of the internet, and its cousins intranets and extranets, has led to the development of more sophisticated "web" based applications. That is, applications are being developed which utilize the industry standard browsers to provide a user interface to sophisticated applications. One example of an internet based application is the storage system management application described in a patent application entitled "Non-hierarchical Application Interface for HTML-based Network Storage Management Programs", by Osmond, et al., application Ser. No. 08/775,034, filed on Dec. 30, 1996 and assigned to the assignee of the present application.

As is known in the art, application programs which are developed using high level programming languages (e.g. the C programming language) are often written in a modular fashion. That is, a large application will generally be broken down into smaller applications, functions, or modules which may be compiled separately and are thus easier to manage during development and debug. After compilation, the many object files corresponding to the source language modules are then linked together to provide a single executable file (i.e. the application).

One problem associated with developing application programs, especially large scale application programs, is the need for the developer to be consistent when using constants. Another problem arises from the need to develop portable programs which may be used on computers with different operating systems. In the "C" programming language, these problems are addressed by the so called "C-preprocessor". The C-preprocessor is an integral part of the C compiler and provides a way for developers to define constants, both positively and conditionally, in order to provide consistency and portability. The C-preprocessor is described in detail in Stephen G. Kochran, "Programming in C", Indianapolis, Ind.: Hayden Books, 1987. In general, the C-preprocessor provides a set of special commands that allow developers to assign names to constants that may then be used throughout the program to refer to the constant. The naming of constants may be done conditionally as well as absolutely.

The HTML language is basically a set of instructions which are used to create an ASCII text document. The instructions, when read by a browser, define how a particular screen or "page" will look when displayed by the browser. By nature, HTML does not provide a rich programming environment like C or other high level programming languages provide. Thus, development and maintenance of web-based applications can become unwieldy. Consider an application that has several dozen different screens or pages which provide the user interface. Then consider the same interface being adapted to variants of the same application. In order to change a constant value or a file pointer (e.g. URL address) for the applications, it may be necessary to individually edit dozens of files individually. Thus the probability for error becomes greater and as such development times increase dramatically. It would be advantageous therefore to provide a development environment for web-based application interfaces which have the richness of typical high level applications programs.

SUMMARY OF THE INVENTION

In accordance with the present invention, a method for developing internet applications with a markup language includes the steps of defining a set of commands in addition to standard markup language instructions. The commands are then imbedded in a first file having said standard markup language instructions. The resulting file is then fed into a preprocessor. The preprocessor reads, on a line by line basis, the contents of the first file. If one of the lines read by said preprocessor includes one of the predefined commands, proscribed steps are taken by the preprocessor with the result of those steps ultimately producing an output which is written to an output file. If the lines read by the preprocessor are standard markup language instructions having none of the predefined commands the lines are written to the output file without modification.

BRIEF DESCRIPTION OF THE DRAWINGS

The above and further advantages of the present invention may be better understood by referring to the following description taken in conjunction with the accompanying drawings in which.

DETAILED DESCRIPTION OF THE PREFERRED EMBODIMENT

Figure 1A:
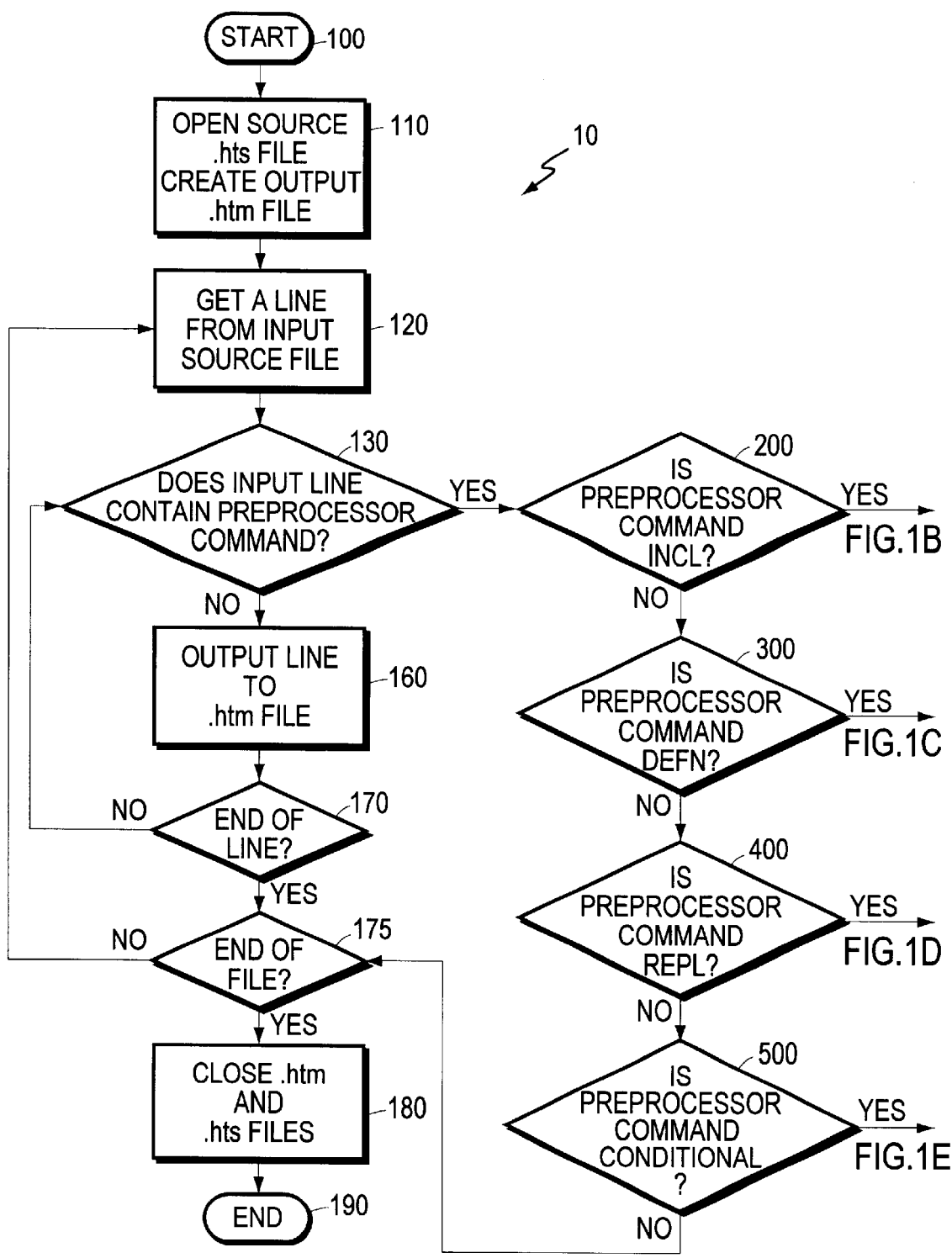
FIG. 1A is a flowchart depicting the overall operation of the preprocessor of the present invention.

In accordance with the present invention, an applications development environment for developing hypertext markup language (HTML) based programs was provided. In order to provide the applications development environment, an HTML preprocessor was developed and a set of preprocessor commands created and defined. The commands are generally non-HTML commands which are imbedded in a source HTML file. When interpreted by the preprocessor, the commands cause an output HTML file which includes all of the original HTML command as well as any substitutions and/or inclusions defined by the preprocessor commands.

According to a preferred embodiment of the present invention, a number of commands are included in the set of preprocessor commands which, as will be discussed in detail below, are interpreted by the preprocessor in order to provide the required preprocessing functionality. Exemplary commands within the set of preprocessor commands of the present invention include, among others, an "include" command, a "define" command, a "replace" command, as well as a set of conditional commands used to conditionally perform a substation or inclusion.

According to the preferred embodiment, the syntax for the "include" command is as follows <INCL "file name">. As suggested by the syntax, the INCL preprocessor command is used to direct the preprocessor to include the entire contents of the file, indicated by "file name", into the location of the source HTML file where the include command appears. An example of the use of the INCLUDE preprocessor command is as follows:

<FORM NAME='some_name'>
    <INPUT TYPE='text'NAME='some_text'>
    <INCL "a_file_containing_another_input_element">
    <INPUT TYPE='submit'VALUE='Press This'>
    </FORM>

In this example, a form is being defined in the HTML source file. As will be described in more detail below, whatever text is contained within the included file is written to the output HTML file. If there are any preprocessor commands in the included file, they are processed in line. This permits nested "includes" and conditional "includes", as well as included conditionals.

Also according to the preferred embodiment of the present invention, the syntax for the "define" preprocessor command appears as follows: <DEFN tag expression>. The DEFN preprocessor command of the present invention is used in conjunction with the "replace" (REPL) preprocessor command to establish a consistent constant name for either a value or an expression. Thus the preprocessor, when it encounters a DEFN preprocessor command, stores the values of the tag and the expression in local memory. During subsequent processing, anywhere in the source HTML file where a REPL command is encountered, the preprocessor will replace the tag with the expression as previously defined. The replace preprocessor command of the present inventions has a syntax as follows: <REPL tag>. An example of the use of the DEFN and REPL commands is shown below:

<DEFN My_button_image "<IMG SRC='ac.gif' HEIGHT=32 WIDTH=80>">
    <A><HREF=javascript:do_something( )><REPL My_button_image></A>

The generated code included in the output file would then look as follows:

<A><HREF=javascript:do_something( )><IMG SRC='ac.gif' HEIGHT=32 WIDTH=80></A>

One way to manage a large application program may be to make several or even hundreds of definitions and place all the DEFN commands within a separate file. The definitions in the separate file may then included, via the INCL preprocessor command, into the source HTML file as described above. Thus it can be seen that management of constants or constant expressions may be done in a single place and then included within several files of an application program.

In addition to the commands described above, the preprocessor of the present invention also supports a set of conditional expressions which allow the above three commands to be used in conjunction with an evaluated conditional expression to either include files, define tags, or replace tags or generally cause and output to the destination file depending on the conditional expression. According to the preferred embodiment, the conditional expressions include IFDEF, ENDIF, IFNDEF. The syntax for the conditional expressions may have several combinations an example of which is shown below:

<IFDEF SNMS>
    <H2>Welcome to SNMS</H2>
    <ELSE>
    <IFDEF SNFS>
    <H2>Welcome to SNFS</H2>
    <ELSE>
    <H2>Welcome to SNBR</H2>
    <ENDIF>
    <ENDIF>

In the above example, different welcome messages are placed in the output HTML file by the preprocessor depending on which of the constants SNMS, SNFS, SNBR have previously been defined. In addition to the straightforward example shown above, rather than simply provide a particular item to the output file when a condition is true, other preprocessor commands may be evaluated when a condition is met as shown in the following example:

<IFDEF SNMS>
    <INCL snms.hts>
    <H2>Welcome to SNMS</H2>
    <ELSE>
    <IFDEF SNFS>
    <INCL snfs.hts>
    <H2>Welcome to SNFS</H2>
    <ELSE>
    <H2>Welcome to SNBR</H2>
    <INCL snbr.hts>
    <ENDIF>
    <ENDIF>

Here, the file snms.hts may have all the appropriate definitions and replace commands to create the appropriate HTML code for producing the SNMS display page. It can be seen then that with the conditional expressions evaluated by the preprocessor, other preprocessor commands may be executed depending on previously defined tags or constants or other values which are available by the time the preprocessor reaches the conditional expression.

Although a select few commands were described above, it should be understood that the commands described above were for illustration purposes only. Other commands may also be provided which enable an applications developer programming an interface using an HTML language to provide a rich programming environment similar to those of the high level programming languages.

The operation of the preprocessor of the present invention will now be discussed in connection with FIGS. 1A through 1E. Referring first to FIG. 1A, a flow chart 10 is shown which depicts the generalized operation of the preprocessor of the present invention. Use of the preprocessor of the present invention assumes that the preprocessor commands defined above have been embedded along with HTML instructions in a source file (HTS) as described above. Operation of preprocessor of the present invention starts at step 100 with the loading of the preprocessor program into a computer memory and providing on the command line, the name of the input source file (e.g. source .hts). At step 110, the source HTS file which has been identified to the preprocessor is open for reading. At the same time, an output HTML file is open for writing. In order to distinguish the source file including the preprocessor commands and the output file including the substitutions and the operations performed by the preprocessor, the preferred embodiment of the present invention expects that an input file will have the extension .hts while the output file created by the preprocessor will have the extension .htm (as is conventional for files read by a browser). Once the input and output files are open, processing on the input file begins at step 120 where the first line of the input file is read. At step 130 an evaluation is performed on the input line to determine whether that line includes one of the previously described preprocessor commands. If one of the previously defined preprocessor commands is contained within the line read by the preprocessor, processing moves to step 200 of the flow chart.

Each of the evaluation steps 200, 300, 400, and 500 of flow chart 10 is used to identify the particular preprocessor command encountered in the input line. Thus, for example, if at step 200 the preprocessor has identified the include preprocessor command a series of steps will be taken by the preprocessor as will be discussed below in connection with FIG. 1B. Similarly, the evaluation steps 300, 400, and 500 identify the other pre-defined preprocessor commands with the appropriate actions taken in as described in FIGS. 1C, 1D, and 1E respectively. After execution of the particular steps associated with the respective preprocessor commands the process returns to step 170 of flow chart 10. At step 170, a test is performed to determine whether the end of the input line has been reached. If the end of the input line has not been reached, processing returns to step 130 where the input line is read analyzed further. Alternately, if the end of an input line has been reached, processing proceeds to step 175 where an end of file test is performed. If the end of the input file has not been reached, processing returns to step 120 with another input line being read from the source HTS file.

If at step 130, instead of encountering a preprocessor command as described above, the line read from the input file does not contain a preprocessor command, processing simply moves to step 160 with the input line being written as an output line to the HTML output file. From step 160 processing continues to step 175 where an end-of-file condition is checked. If the end of the input file has not been reached, then processing end moves back to step 120. If, however, the end of the input file has been reached processing moves to step 180 where both the input source file and the output HTML file are closed. The process then moves to step 190 where the preprocessing function ends.

Figure 1B:
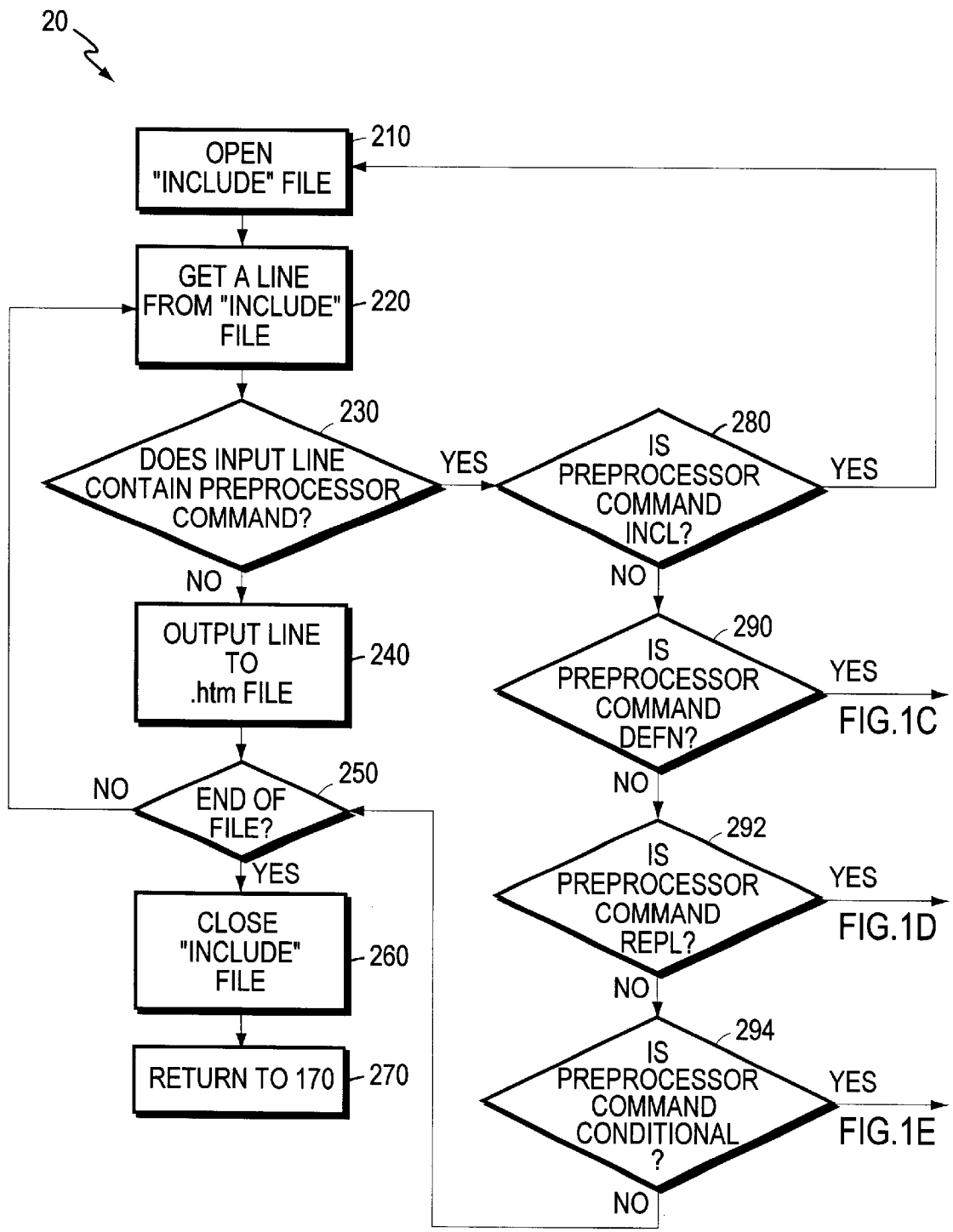
FIGS. 1B–1E are flowcharts depicting the actions of preprocessor in response to various preprocessor commands encountered in a source file.

Referring now to FIG. 1B, flow chart 20 depicts the steps performed by the preprocessor of the present invention when an input file line has been evaluated to include the INCL preprocessor command as determined by step 200 of flow chart 10 (FIG. 1B). At step 210 of flow chart 20, the file identified with the file name attribute of the include preprocessor command is opened by the preprocessor for reading. If the file can not be opened, an error report may be generated to the user. As with the source HTS file, the file identified to be included in the output HTML file will be subject to the process of flow chart 10 of FIG. 1A. That is, each of the lines of the file to be included evaluated by the preprocessor as if it were a source file. As each line of the include file is evaluated, the contents of the file or the appropriate substitutions are inserted into the output HTML file until the end of file of the include file has been reached. At step 240, the file to be included is closed with the process returning to step 170 of flow chart 10 (FIG. 1A).

Figure 1C:
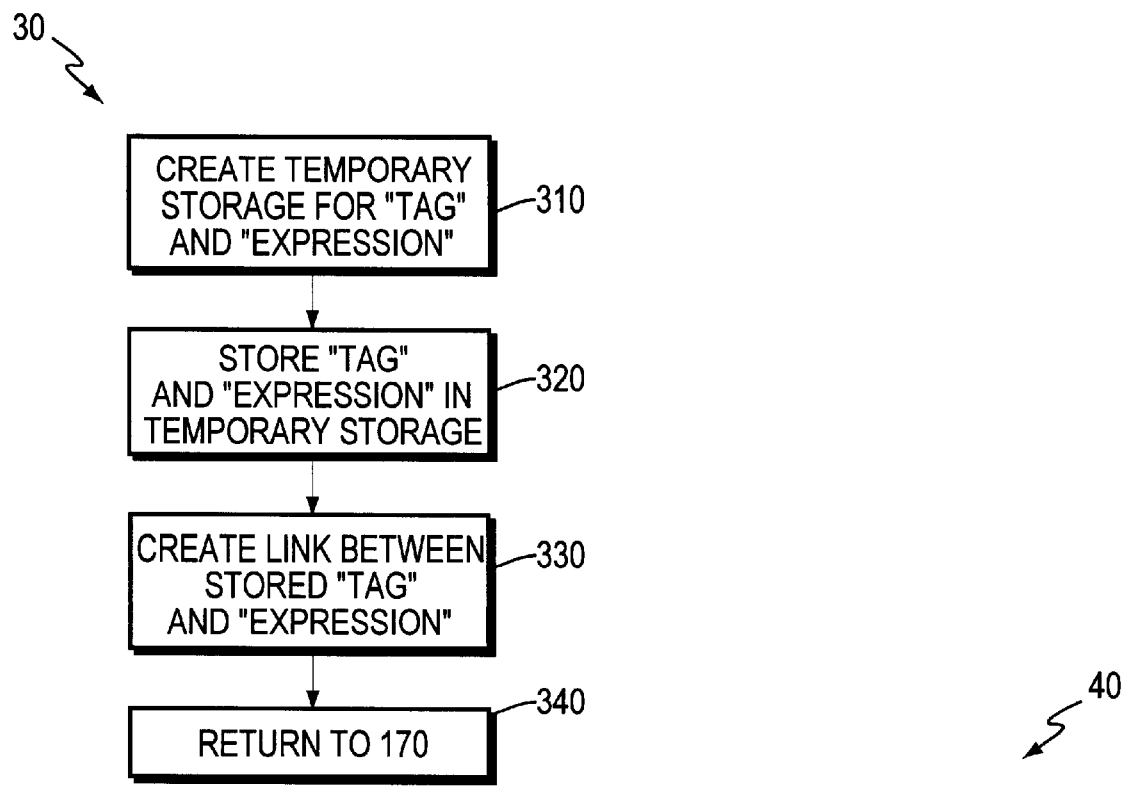

Referring now to FIG. 1C, flowchart 30 depicts the steps taken by the preprocessor of the present invention when a "DEFN" or define command is encountered in the source .hts file. In response to reading a source line containing a DEFN command, the preprocessor will first, at step 310, create temporary storage space for both the tag and expression portion of the define command. The tag and expression are then stored in the temporary storage at step 320. Finally, at step 330, a link is created between the stored tag and expression. The link may actually be a result of the manner in which the tag and expression are stored. That is, they may be stored in a two by X dimensional array. The tag and expression would then be stored at the same index into the array with an offset from the index used to store or retrieve the expression. The link is necessary to furnish the correct expression when the tag is later encountered in connection with the REPL command.

Figure 1D:
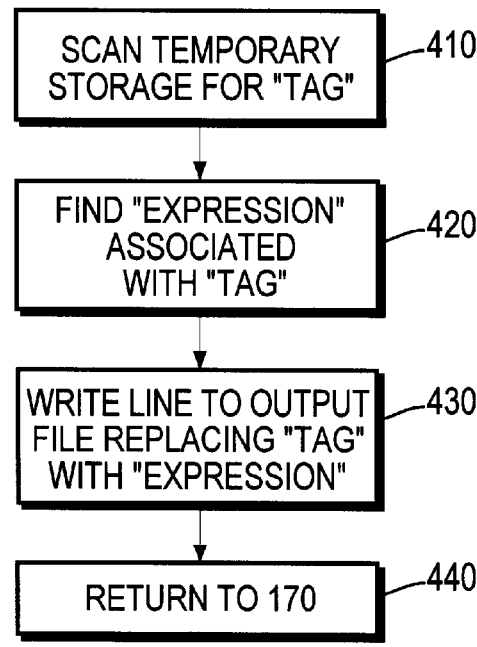

Referring now to FIG. 1D, flowchart 40 depicts the steps taken by the preprocessor of the present invention when a "REPL" or define command is encountered in the source .hts file. In response to reading a source line containing a REPL command, the preprocessor will first, at step 410 scan the temporary storage to find the tag specified in the REPL command. Once the tag is found, the preprocessor then finds the expression associated with the specified tag, at step 420. Then, at step 430, the preprocessor writes the associated expression to the output HTML (i.e. the file having the .htm extension) file at the place where the REPL command resided in the input file. Processing then returns to step 170 (FIG. 1). Of course, if the specified tag were not found in the temporary storage, an error report or some other action would most likely occur.

Figure 1E:
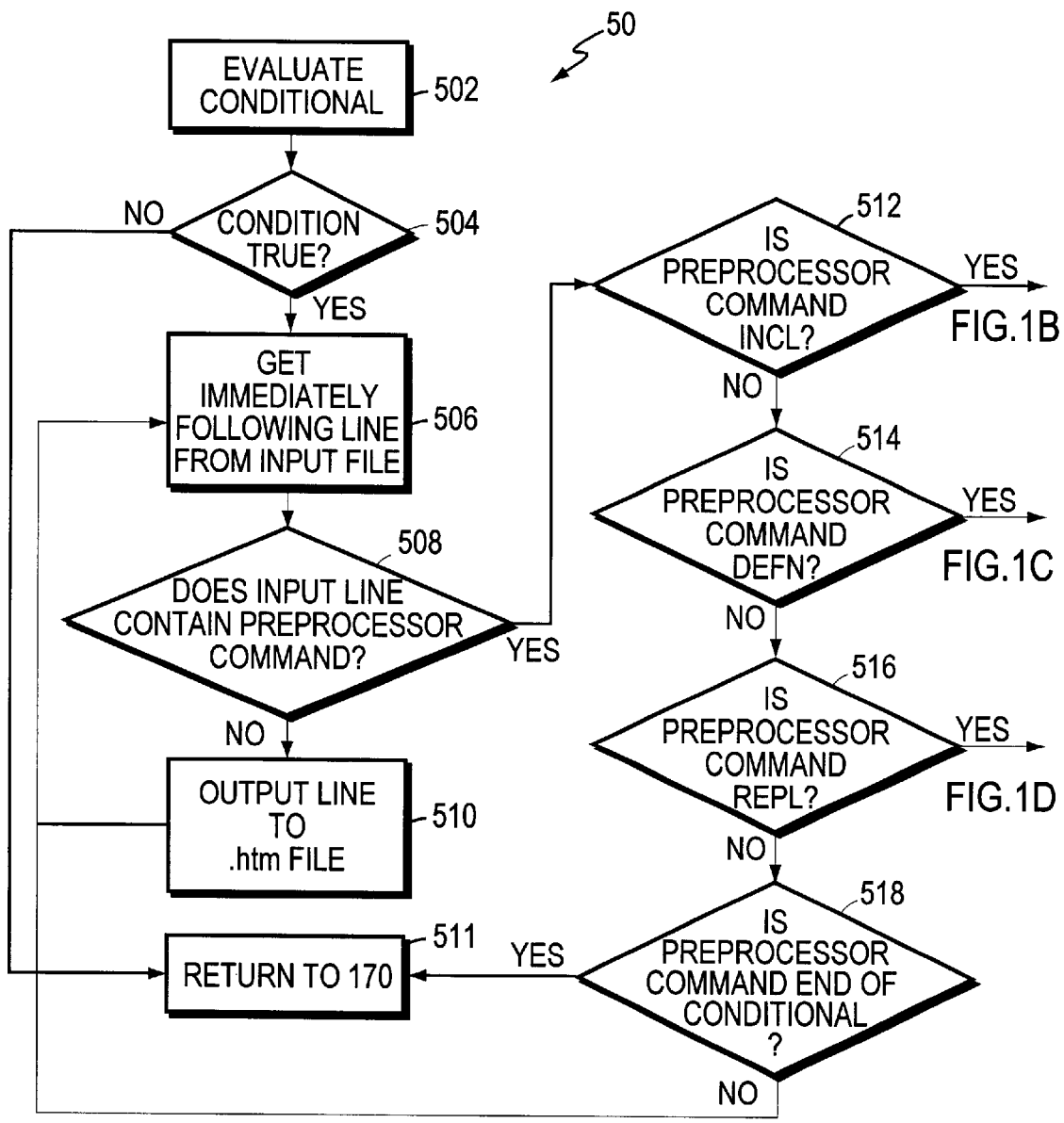

Referring now to FIG. 1E, the steps taken by the preprocessor of the present invention when upon encountering an IFDEF conditional command are depicted by flowchart 50. First, at step 502, the preprocessor will evaluate the conditional statement read from the source HTS file. IF the condition is true, as determined at step 504, the preprocessor will get the immediately following input line from the source HTS file (step 506). At step 508, that input line is evaluated to determine if it contains one of the preprocessor commands. If it does, the preprocessor command is evaluated as depicted in steps 512–518 and operates as described above with reference to FIG. 1A. If the input line retrieved at step 506 does not contain a preprocessor command, the line is written to the output HTML file as indicated in step 510. At this point processing continues at step 506 with the retrieval of another input line. Alternately, if the line retrieved at step 506 is another preprocessor command, it will be evaluated according to steps 512–516. If the command is an ENDIF conditional command as determined at step 518, the process returns to step 170 (FIG. 1A) as indicated by step 511.

It can be seen then that the preprocessor of the present invention provides a powerful applications development environment for developing RTML based applications. It will be apparent to those of skill in the art that other preprocessor commands may be employed to provide differing functionality without departing from the underlying concept of centralized applications development and management.

Having described a preferred embodiment of the present invention it will now become apparent to those of skill in the art that other embodiments incorporating its concepts may be provided. It is felt therefore, that this invention should not be limited to the disclosed embodiment but rather should be limited only by the spirit and scope of the appended claims.

What is claimed is:

1. A method for developing internet applications with a markup language comprising the steps of:

defining a set of commands in addition to standard markup language instructions;

imbedding one of said commands in a first file having said standard markup language instructions;

inputting said first file to a preprocessor;

reading, by said preprocessor, lines of said first file;

if one of said lines read by said preprocessor includes one of said commands, executing said command and outputting to an output file a result of said execution; and if said one of said lines read by said preprocessor is a standard markup language instruction having none of said commands, outputting said standard markup language instruction to said output file without modification.

2. An applications programming environment for use in developing internet applications programs with a markup language comprising:

a set of preprocessor commands for embedding in a computer file containing markup language definitions and stored in a memory; and a preprocessor capable of receiving said computer file as an input and further capable of scanning said computer file to identify ones of said set of preprocessor commands located therein, said preprocessor further capable of generating an output file including data substitutions defined by said ones of said preprocessor commands as well as all said original markup language definitions.

3. The applications programming environment as in claim 2 wherein one of said preprocessor commands is a first instruction to include another file in said output file at the location in said computer file that said first instruction is located and wherein said preprocessor is responsive to identification of said first instruction for, during generation of said output file, inserting said another file said location in said output file.

4. The applications programming environment as in claim 3 wherein one of said preprocessor commands is a second instruction to define a tag to have an equivalence value and wherein said preprocessor is responsive to identification of said tag anywhere in said computer file or said other file for inserting said equivalence value in place of said tag in said output file.

5. The applications programming environment as in claim 2 wherein one of said preprocessor commands include instructions to conditionally perform said first or second instructions depending on whether a label has previously been defined and wherein said preprocessor is responsive to identification of said instructions to execute said first or second instructions if said label has been defined and to ignore said first or second instructions otherwise.

* * * * *